(12) United States Patent
Noda

(10) Patent No.: US 8,180,625 B2
(45) Date of Patent: May 15, 2012

(54) MULTI LANGUAGE EXCHANGE SYSTEM

(76) Inventor: Fumitaka Noda, Hawthorn (AU)

( * ) Notice: Subject to any disclaimer, the term of this patent is extended or adjusted under 35 U.S.C. 154(b) by 944 days.

(21) Appl. No.: 12/093,483

(22) PCT Filed: Nov. 14, 2006

(86) PCT No.: PCT/AU2006/001699
§ 371 (c)(1),
(2), (4) Date: May 13, 2008

(87) PCT Pub. No.: WO2007/053911
PCT Pub. Date: May 18, 2007

(65) Prior Publication Data
US 2008/0288241 A1  Nov. 20, 2008

(30) Foreign Application Priority Data
Nov. 14, 2005 (AU) .................................. 2005906294

(51) Int. Cl.
*G06F 17/28* (2006.01)
(52) U.S. Cl. ......... 704/4; 704/2; 704/3; 704/7; 434/156; 434/157; 434/159
(58) Field of Classification Search .............. 704/1, 2–4, 704/10, 7; 434/156–157, 159
See application file for complete search history.

(56) References Cited

U.S. PATENT DOCUMENTS

| | | | | |
|---|---|---|---|---|
| 5,169,342 A | * | 12/1992 | Steele et al. | 434/112 |
| 5,275,818 A | | 1/1994 | Kind | |
| 6,022,222 A | * | 2/2000 | Guinan | 434/169 |
| 6,024,571 A | * | 2/2000 | Renegar | 434/157 |
| 6,339,410 B1 | * | 1/2002 | Milner et al. | 345/1.1 |
| 6,341,958 B1 | * | 1/2002 | Zilberman | 434/157 |
| 6,434,518 B1 | * | 8/2002 | Glenn | 704/3 |
| 6,685,188 B2 | * | 2/2004 | Rehbein et al. | 273/299 |

(Continued)

FOREIGN PATENT DOCUMENTS

CA  2453716 A1  6/2005

(Continued)

OTHER PUBLICATIONS

International Search Report, Jan. 19, 2007.

*Primary Examiner* — Richemond Dorvil
*Assistant Examiner* — Greg Borsetti
(74) *Attorney, Agent, or Firm* — Moore & Van Allen PLLC; W. Kevin Ransom

(57) ABSTRACT

The invention discloses a multi language exchange system which includes a communication device having an input screen on which a message in a first language is to be translated into a second language. The input screen displays a programmable grid or list having at least one sentence or phrase formed by the grid or list in the first language. Each grid element of the at least one sentence or phrase contains a word or words in the at least one sentence or phrase. Each grid element of the at least one sentence or phrase having a sequence based on the order in which the word or words of the respective grid element would appear in the translation of the at least one sentence or phrase in the second language. The user follows the sequence to allow the at least one sentence or phrase to be translated in the correct order.

27 Claims, 8 Drawing Sheets

U.S. PATENT DOCUMENTS

| | | | | |
|---|---|---|---|---|
| 6,887,080 B2* | 5/2005 | Jeong | | 434/112 |
| 7,801,720 B2* | 9/2010 | Satake et al. | | 704/4 |
| 7,809,550 B1* | 10/2010 | Barrows | | 704/4 |
| 7,818,164 B2* | 10/2010 | Wood et al. | | 704/5 |
| 7,835,914 B2* | 11/2010 | Mizutani et al. | | 704/277 |
| 2001/0029455 A1* | 10/2001 | Chin et al. | | 704/277 |
| 2002/0072038 A1* | 6/2002 | Wen et al. | | 434/157 |
| 2003/0040899 A1* | 2/2003 | Ogilvie | | 704/2 |
| 2003/0105636 A1* | 6/2003 | Wen et al. | | 704/270 |
| 2003/0154067 A1* | 8/2003 | Wen et al. | | 704/7 |
| 2003/0203343 A1* | 10/2003 | Milner | | 434/157 |
| 2003/0232312 A1* | 12/2003 | Newsom et al. | | 434/157 |
| 2004/0078204 A1* | 4/2004 | Segond et al. | | 704/277 |
| 2004/0102201 A1* | 5/2004 | Levin | | 455/466 |
| 2005/0069845 A1* | 3/2005 | Spaventa | | 434/156 |
| 2005/0071150 A1* | 3/2005 | Nasypny | | 704/9 |
| 2005/0196733 A1* | 9/2005 | Budra et al. | | 434/178 |
| 2005/0197825 A1 | 9/2005 | Hagerman et al. | | |
| 2006/0019223 A1* | 1/2006 | Wood et al. | | 434/156 |
| 2006/0040242 A1* | 2/2006 | Mejia | | 434/170 |
| 2006/0216683 A1* | 9/2006 | Goradia | | 434/322 |
| 2007/0050183 A1* | 3/2007 | Kao et al. | | 704/3 |
| 2007/0156394 A1* | 7/2007 | Banerjee et al. | | 704/10 |
| 2007/0244980 A1* | 10/2007 | Baker et al. | | 709/207 |
| 2007/0281286 A1* | 12/2007 | Palacios Orueta | | 434/185 |
| 2008/0097741 A1* | 4/2008 | Bagnato et al. | | 704/2 |
| 2008/0189096 A1* | 8/2008 | Apte et al. | | 704/2 |

FOREIGN PATENT DOCUMENTS

| | | |
|---|---|---|
| JP | 2000206870 A | 7/2000 |
| WO | 2005069159 A1 | 7/2005 |

* cited by examiner

*FIG. 5*

(Click in the order of numbers)

| ① My わたしの | ② favourite すきな | ③ sport スポーツは | ⑤ is です | ④ footy オーストラリアン・フットボール |
|---|---|---|---|---|
| ① I わたしは | ⑤ watched みました | ③ The Grand Final フットボールのけっしょうせん | ④ on TV テレビで | ② yesterday きのう |
| ② What なんの | ③ sport スポーツが | ⑤ do ですか | ① you あなたは | ④ like すき |
| ? | ! | 。 | (icons) | (images) |
| tennis テニス | netball ネットボール | swimming すいえい | cricket クリケット | rugby ラグビー |
| Sport is very popular in Australia. オーストラリアではスポーツがとてもさかんです。 | | | | |

| (ぼんこうのじゅんばんにクリックしてね) | | | | |
|---|---|---|---|---|
| ① わたしの My | ② すきな favourite | ③ スポーツは sport | ⑤ すもう sumo | ④ です is |
| ① わたしは I | ⑤ にちようび に on Sunday | ③ せんしゅうらく を the final match | ④ こくぎかんで at the national arena | ② みました watched |
| ④ あなたは you | ① なんの What | ② スポーツが sport | ⑤ すき like | ③ ですか do |
| ? | ! | 。 | (Icons) | (Images) |
| やきゅう baseball | からて karate | けんどう Kendo | じゅうどう judo | サッカー soccer |

すもうはにほんのこくぎです。
Sumo is a national sport in Japan.

*FIG. 6*

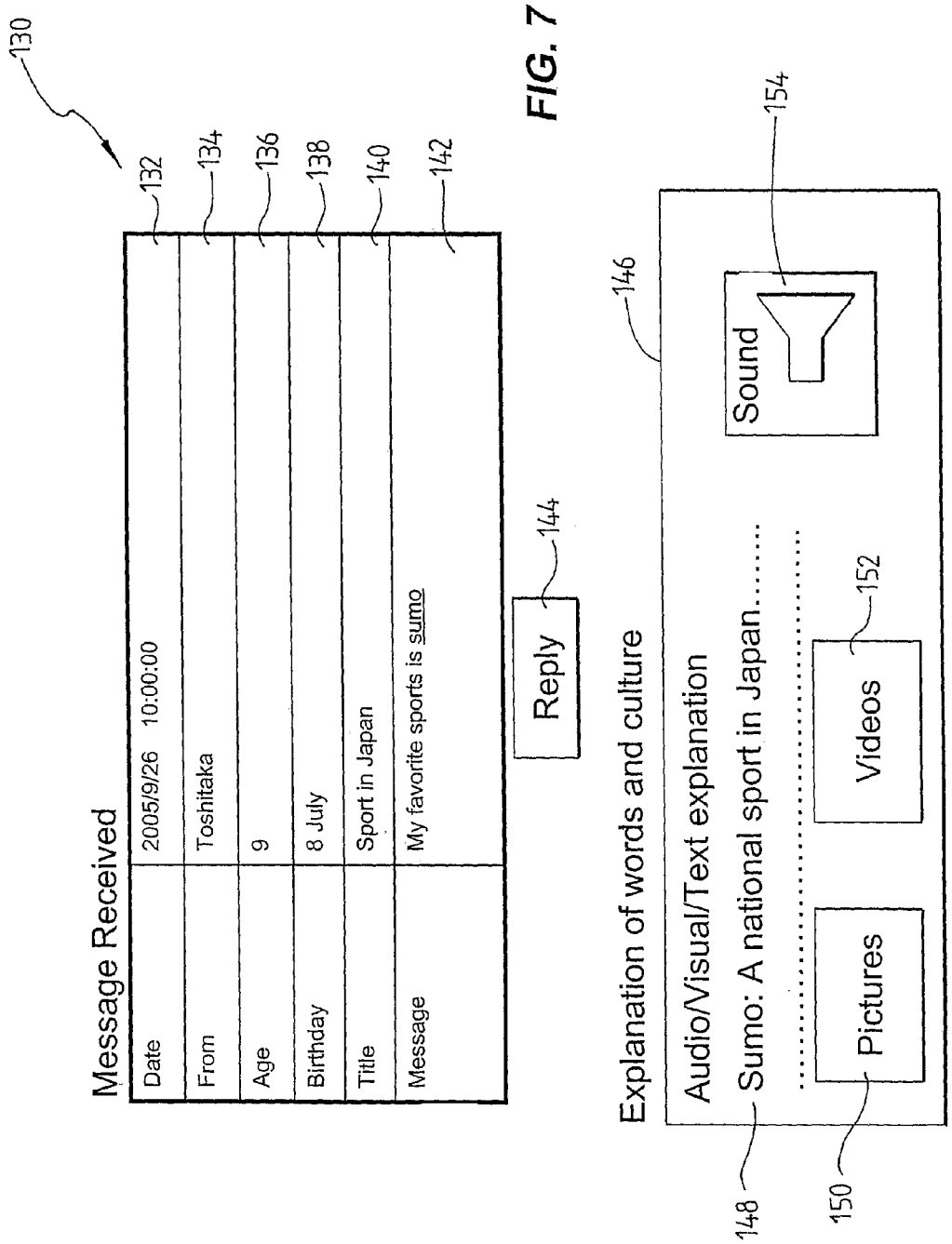

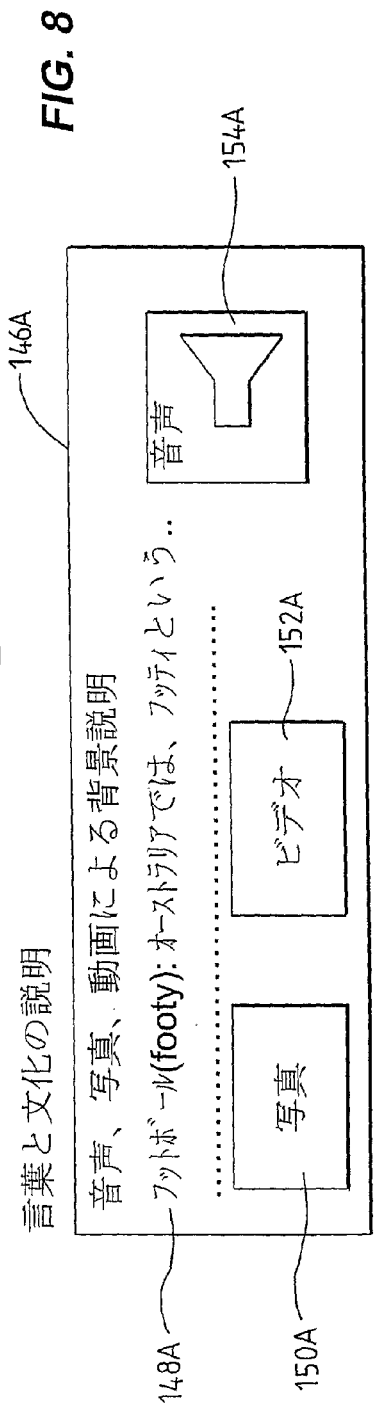

MULTI LANGUAGE EXCHANGE SYSTEM

FIELD

This invention relates, in general, to a multi language exchange system for messaging in one language to another and relates more particularly, though not exclusively, to an Internet based multi language exchange system.

BACKGROUND

Around the world, globalization has been theme from the past century and is even more important in the 21$^{st}$ century. Being able to effectively communicate with people in different countries and cultures is desirable. The English language is fast becoming a common language and the need to learn communicative English is growing in non-English speaking countries. In addition, the importance of cultural education is increasing to understand the background of communication and this is also required in the English speaking world to deal with the non English speaking world. To respond to this globalization trend, for example in Japan, there have been numerous English schools and English learning materials available in the market for a long time. Global education and international understanding are now school subjects. In Australia, there has been a drive since 1994 when the government emphasized LOTE (Language Other Than English) learning and as a result many primary schools started LOTE education from pre-school age. There have been many learning materials, kits and CD-ROMs available in classrooms, in educational institutions, and in homes in both countries to aid the process of teaching and learning another language.

However in Japan, Australia and elsewhere, one common problem is the difficulty of people understanding the value of learning foreign languages. Giving purpose to learn another language is the ideal solution to this problem many people would agree upon, but finding the actual purpose was not easy. Therefore many solutions available in the market today are aimed at sustaining the interest of students and motivating them to keep learning, but many have failed as they could not provide opportunities to use the acquired language in a meaningful and purposeful way. In Japan, for example, many interactive CD ROMs and software provide an element of entertainment, but because the response is not natural and is not the same as real human interaction, it fails to maintain continued interest among young learners of English. Children like children as partners but in Japan it is difficult to find native English speaking children as partners. Adult native teachers are not effective enough as partners as they cannot talk to children about cartoons or sport in the same manner as same aged peers could. Children cannot sustain interest in learning if the learning is not in line with their personal interests and do not have a chance to practice the language on foreigners.

When people living in different countries with different languages want to exchange messages and become friends, they had to construct sentences in a second language and type them from keyboards. This restricted users who lacked those skills to create overseas friends and exchange regularly. With conventional email systems, users can instantly send/receive messages. Conventional translation software can translate certain words, but lacks accuracy which become an obstacle to email exchange. Also, using translation devices does not let the user have direct experience of constructing messages in another language and understand the structural differences between these languages. Furthermore, there were no mechanism to instantly find words and phrases that are immediately relevant to the users constructing the messages.

It is therefore an object of the present invention to provide a multi language exchange system which provides easy communication in a foreign language without specialized language translation skills.

A further object of the present invention is to provide a multi language exchange system which translates text accurately.

BRIEF SUMMARY

With these objects in view the present invention provides a multi language exchange system, said system including a communication device which includes an input screen on which a message in a first language is to be translated into a second language, said input screen displaying a programmable grid or list having at least one sentence or phrase formed by said grid or list in said first language, each grid element of said at least one sentence or phrase containing a word or words in said at least one sentence or phrase, each grid element of said at least one sentence or phrase having a sequence based on the order in which the word or words of the respective grid element would appear in the translation of said at least one sentence or phrase in said second language, wherein a user would follow the sequence to allow said at least one sentence or phrase to be translated in the correct order.

Preferably each grid element includes a representation of the word or words in both the first and second languages.

In a preferred embodiment said programmable grid provides a plurality of sentence or phrases which are contained in a database which is sorted under various subjects or interests. It is preferred that said communication device communicates via the Internet.

The invention also provides a method of sending a message translated from a first language to a second language through an electronic communication system, said method including the steps of using a communication device having an input screen on which said message in said first language is to be translated into said second language, said input screen displaying a programmable grid or list having at least one sentence or phrase formed by said grid or list in said first language, each grid element of said at least one sentence or phrase containing a word or words in said at least one sentence or phrase, each grid element of said at least one sentence or phrase having a sequence based on the order in which the word or words of the respective grid element would appear in the translation of said at least one sentence or phrase in said second language, using a pointer device to follow the sequence to allow said at least one sentence or phrase to be translated in the correct order and sending said translated message through said electronic communication system.

The invention is a simple but real human based, personally relevant and spontaneous exchange platform which allows users from as young as 5 years old to adults to interact with peers in another world. In case of children, it works on the thrust of their natural interest of wanting to discover new things and making friendships with other children of similar interests in a different world. This all gives enormous motivation and purpose to the users to actually try the language they have learned inside classrooms and understand the potential of it, and the same principle can be applied to grown-ups as well. With prior art, this could not be achieved because real humans were not available and even if the technology enabled connection with humans living overseas, they did not provide simple method for instant interaction with minimum language proficiency. Further, prior arts failed to sustain interests of the users involved as there were no systematic mechanism for making the context of exchange personally relevant but also comprehensive on the other side.

BRIEF DESCRIPTION OF THE SEVERAL VIEWS OF THE DRAWINGS

In order that the invention may be more readily understood and put into practical effect, reference will now be made to the accompanying drawings, in which:—

FIG. 5 is an enlarged view of the message construction window of the computer data entry screen shown in FIG. 3;

FIG. 6 is an enlarged view of the message construction window of the computer data entry screen shown in FIG. 4;

FIG. 7 is a view of a computer message screen of the multi language exchange system of FIG. 1 for an English speaking user; and FIG. 8 is a view of a computer message screen of the multi language exchange system of FIG. 1 for a Japanese speaking user.

DETAILED DESCRIPTION OF THE DRAWINGS

Figure 1:
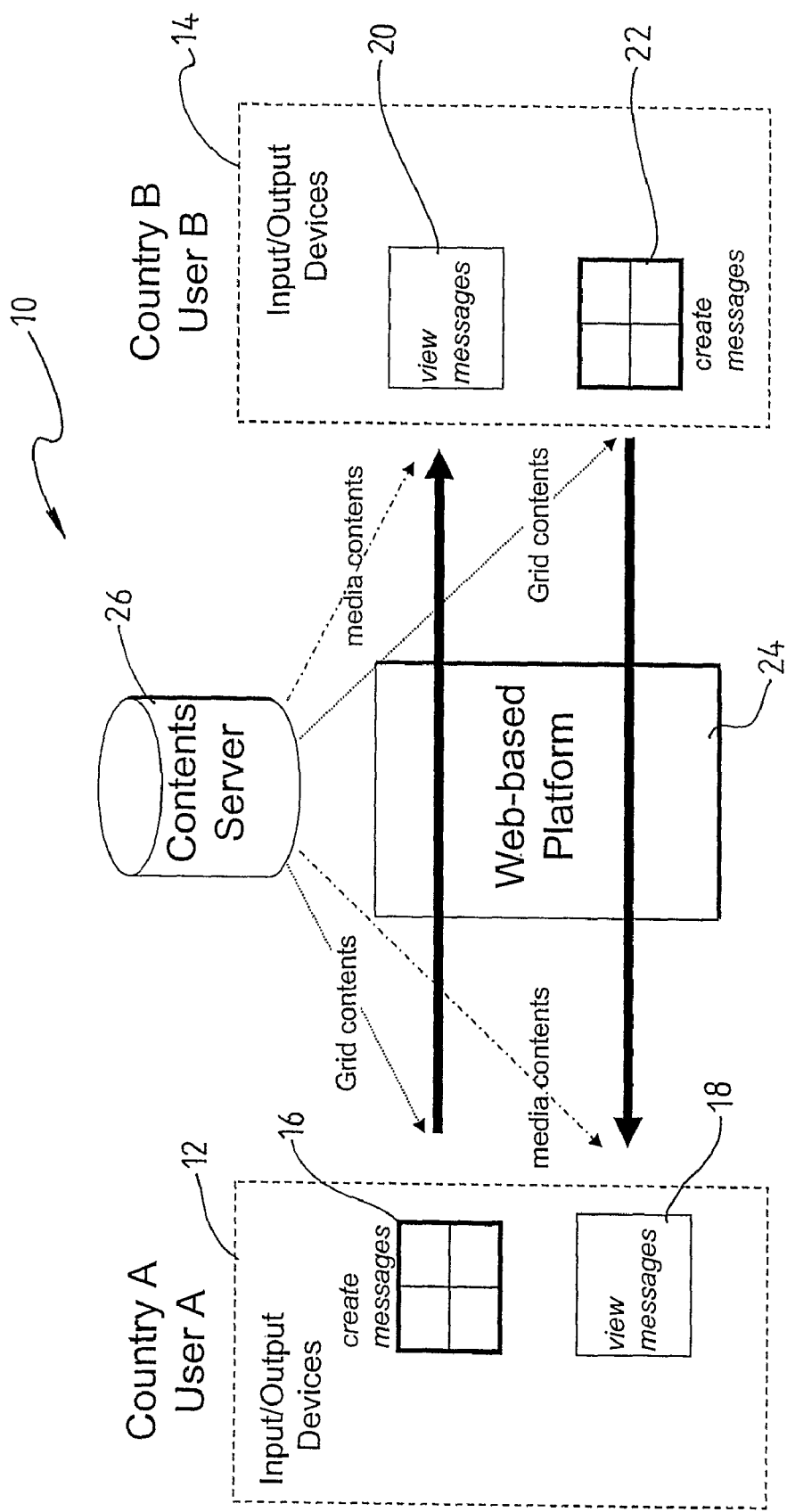
FIG. 1 is a schematic view of a multi language exchange system made in accordance with a preferred embodiment of the invention.

In the drawings there is shown a multiple language exchange system 10 which uses the Internet for communication. The preferred embodiment will be discussed with reference to English and Japanese speaking users, but is not limited to this combination. The system could be used for Japanese and French users or any combination of any language. In this embodiment a first user is based in Australia and has a computer 12 and a second user is based in Japan with a computer 14. The users communicate through menus on their computers 12, 14. The Australian user has a message creation menu 16 and a message viewer menu 18 whilst the Japanese user has a message creation menu 22 and a message viewer menu 20. The appearance of menus 16-22 can vary to suit particular requirements and design criteria and are not limited to those described. For example, menus 16 and 18 may appear on the same monitor screen together, or be separately selectable. Computers 12, 14 communicate via the Internet on a web based platform 24. The web based platform 24 provides communication with a contents server 26 which contains dictionaries for the various languages, software for controlling operation of the multi language exchange system, audio and visual media files and other relevant material and computer files for operation of the system.

Figure 2:
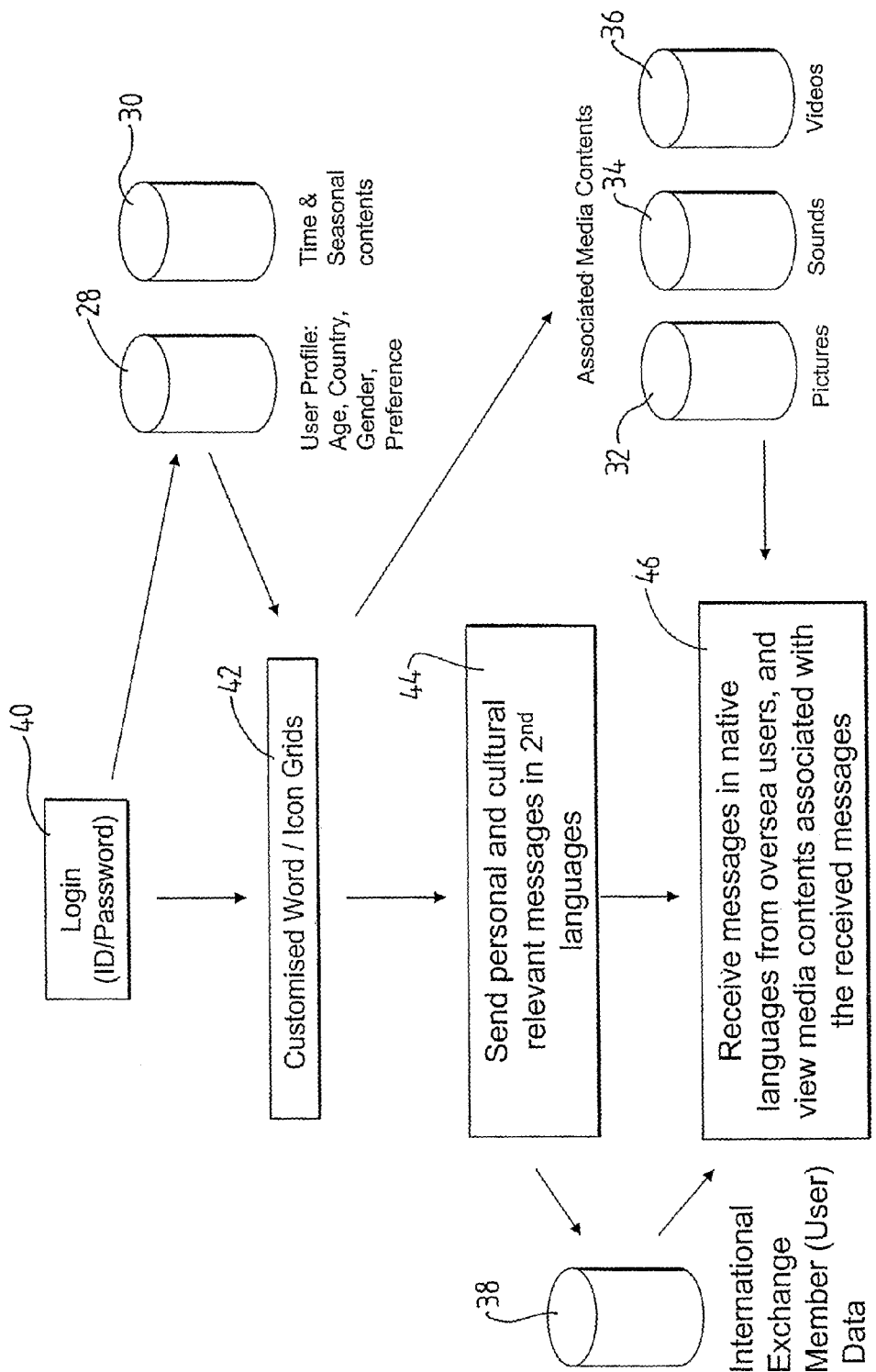
FIG. 2 is a flow chart of operation of the multi language exchange system shown in FIG. 1.

FIG. 2 shows a flow chart illustrating operation of multi language exchange system 10. Contents server 26 has been separated into various subsections which maintain components of the system. A user database 28 holds information on details of each user. Such information would include name, address, age, gender, interests and other information which is useful in providing interesting facts to other users. Database 30 contains information on time, seasons, history and other information. Summer time in Australia will be winter in Japan. A selection of audio and visual files are also classified and stored on contents server 26 and may include, but are not limited to, pictures 32 e.g. JPEG files, audio files 34 e.g. WAV files and video files 36 e.g. AVI files. An exchange database 38 allows the user to communicate with another user in another language.

The operation of the system 10 will be explained in greater detail later in this specification with reference to the menus. The user, for example, based in Australia, will log into the system 10 through a web connection at step 40. System 10 will provide customised menus for the user at step 42 based on the user database 28 and the information database 30. The user can construct a message (to be described later) and can send it to another user, for example, in Japan at step 44. The message can be constructed with the assistance of the audio visual files 32-36. The message will be sent in correct Japanese with little effort from the Australian user. The message will be delivered to the exchange database 38 and the message can be received by the Japanese user at step 46. The Japanese user will be able to read the message in Japanese and have access to any of the audio visual files 32-36 selected by the Australian user to be included in the message.

Figure 3:
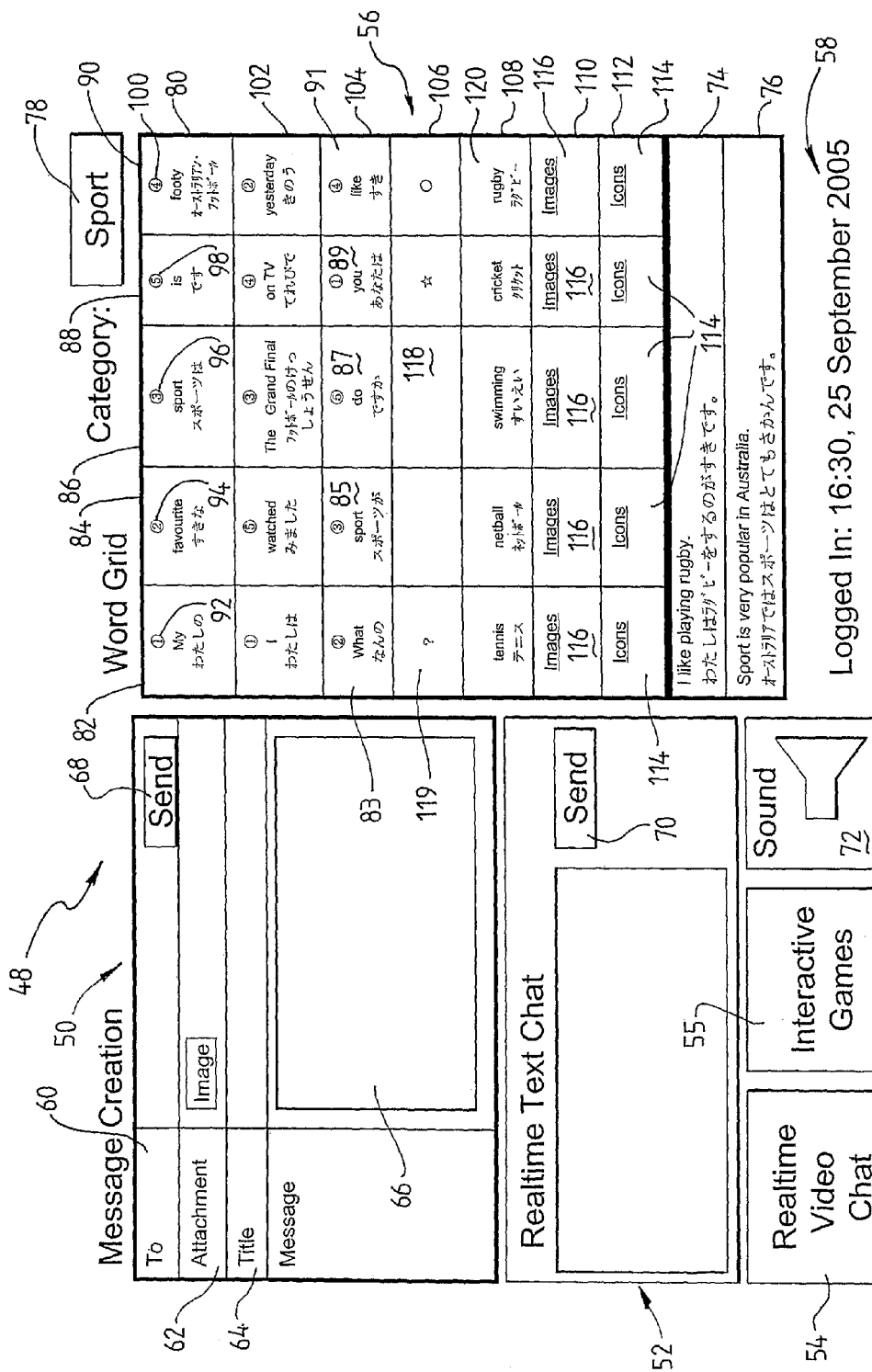
FIG. 3 is a view of a computer data entry screen of the multi language exchange system of FIG. 1 for an English speaking user.

FIGS. 3 and 5 show an example of a typical input screen 48 which would appear on the computer 12 of the Australian user. The input screen 48 is divided into a number of operational windows for assistance to the user to communicate to the Japanese user. The windows may include an email window 50, a real time conversation window 52, a real time video conferencing window 54, a message construction window 56 and a taskbar 58.

The email window 50 includes an address selection 60 where the email address of the addressee can be typed or entered from a drop down box. Any attachments to be included in the message will be listed in the attachment selection 62. The heading of the message will be entered in the title selection 64 and the message itself will be shown in the message box 66. A SEND button 68 is provided to allow the constructed message to be forwarded to the Japanese user as an email when the message is completed. A message can be typed directly in the message box 66, with or without translation, or can be inserted by use of the message construction window 56. If an on-line conversation is required, rather than sending an email message, then the real time conversation window 52 can be used. Similarly, a message can be typed directly in the window 52, with or without translation, or can be inserted by use of the message construction window 56 and forwarded when the SEND button 70 is activated. The real time video conferencing window 54 uses a camera (not shown) to provide video conferencing using established techniques of the type known as Microsoft NetMeeting or similar operating software. A mute button 72 can prevent the audio from being transmitted. Buttons 55, 55A can be provided to provide access to interactive games. The games can be played using foreign languages, in which case, the grid can be used to construct questions and answers in foreign languages, or it can be language independent and allow the users to interact with each other in a fun manner to gain confidence with the use of the system.

The message construction window 56 is divided into a grid which contains words, icons, images, etc which can be used to construct a sentence or phrase. The message construction window 56 also has two sentence windows 74, 76 which display completed sentences or phrases. These sentences or phrases can be put into a message with just one click of a mouse or other pointing device. The contents of the grid will vary dependent on the subject matter that the message will contain. In the example shown in FIG. 3 the category "Sport" has been chosen from a drop down box or menu option 78. The categories can vary to select the intended content of the message, for example, "School", "Hobbies", "Family", etc, to allow a variety of subjects to be discussed. When a different category is selected, the words, icons, images, etc will change to match that category. The grid can be of any size and may contain typical sentences that could be included in a message. In the first horizontal grid 80 a simple sentence is shown as "My favourite sport is footy". The particular English words are shown in each tile or grid element 82-90 of horizontal grid 80 together with the Japanese translations of those words. Each tile 82-90 of the grid 80 has a number 92-100 which indicates the order in which the words would appear in the Japanese language. Such variation in the order of words is typical in many languages as evidenced by the French and German languages. Horizontal grids 102, 104 include other sentences which a user may wish to use. Punctuation can be found in horizontal grid 106 and other sample words can be found in horizontal grid 108. Horizontal grids 110, 112 include icons 114 which could link to a video clip or images 116 which may better explain the message. The tiles in the message construction window 56 are not limited to the examples shown but are indicative of the type of information that is made available to the user. The message construction window 56 is pointer based, typically a mouse or other pointing device, which allows sentences to be constructed without typing.

In use, if the Australian user wants to send a message saying "My favorite sport is footy.", then a user would click tiles 92, 94, 96, 100, 98 and 118 in that order. The message would appear in a preview window 74 or directly in the message box 66, real time conversation window 52, dragged to a location or placed in any other desired location. To change the sentence to "My favourite sport is rugby", a user would click tiles 92, 94, 96, 120, 98 and 118 in that order. The word "rugby" may be associated with a video clip which could be highlighted to indicate that the word is linked to a video clip on rugby. If you were sending the message "What sport do you like?", a user would click the tiles 89, 83, 85, 91, 87, 119 in that order. The message will then be translated correctly and in the required order. Each word may be associated with a sound file so the message may appear visually and aurally to assist in pronunciation of the words in either or both of the native and translated language.

Figure 4:
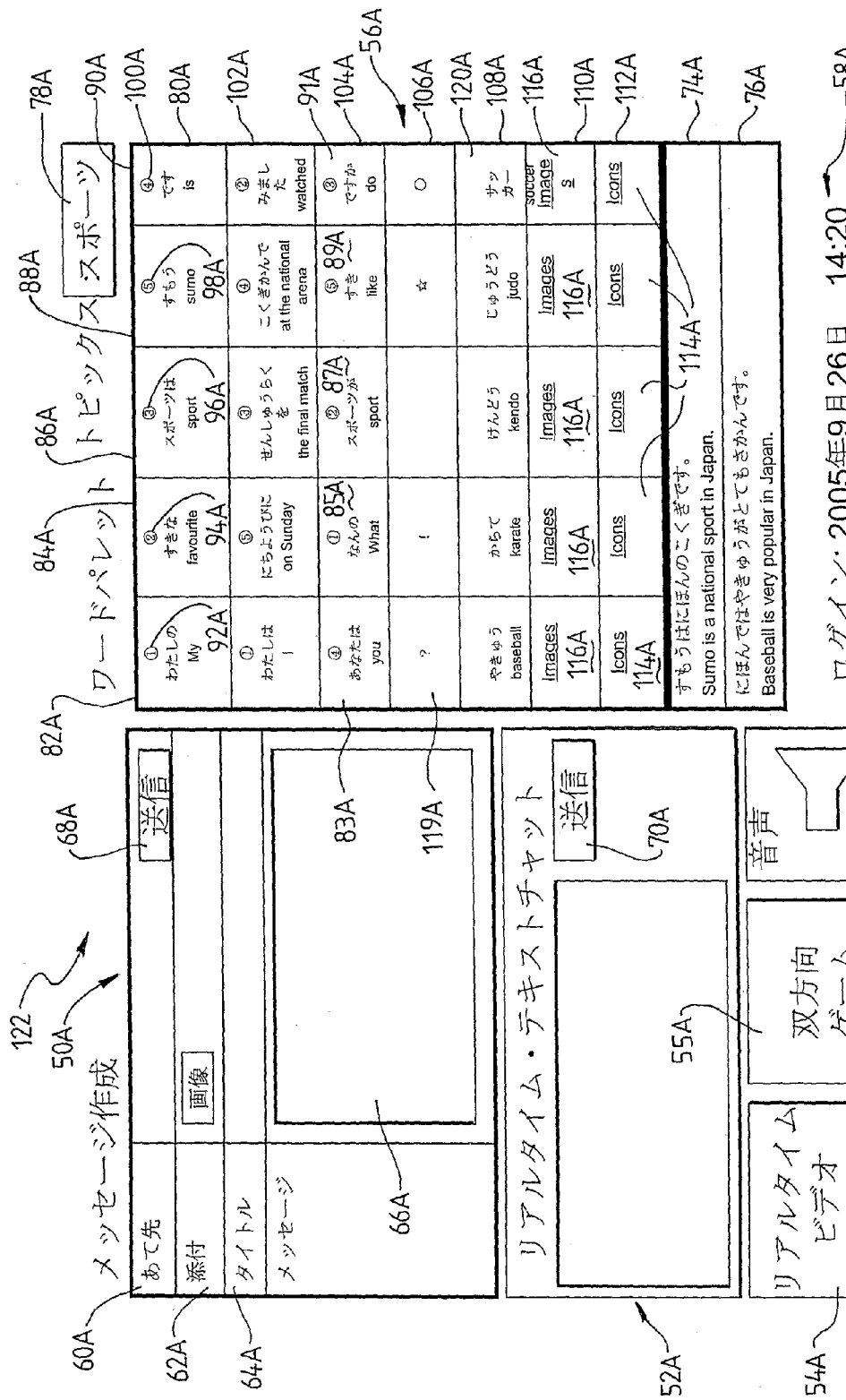
FIG. 4 is a similar view to that of FIG. 3 but showing a computer data entry screen of the multi language exchange system of FIG. 1 for a Japanese speaking user.

FIGS. 4 and 6 illustrate an example of a typical input screen 122 which would appear on the computer 14 of the Japanese user. In order to avoid duplication and repetition of description, integers in FIGS. 4 and 6 corresponding to integers in FIGS. 3 and 5 have been given an "A" suffix, for example, message construction window 56 in FIGS. 3 and 5 is message construction window 56A in FIGS. 4 and 6. For the Japanese user the words in the grid of message construction window 56A are in Japanese order. Accordingly, when sending the message "What sport do you like?", a Japanese user would click the tiles 85A, 87A, 91A, 83A, 89A, 119A in that order which is the order an Australian user would understand.

FIG. 7 shows a message screen 130 where messages sent using the screens shown in FIGS. 3 to 6 are received. This screen is for the Australian user. The message screen 130 has a number of panels which are in common use in email applications. The panels include a date panel 132, a sender panel 134, an age panel 136, a birthday panel 138, a title panel 140 and a message panel 142. The panels can vary to suit requirements and can be deleted or substituted for relevancy. A REPLY button 144 is provided so the Australian user can respond to the Japanese user. As previously discussed the message was constructed by the Japanese user in Japanese but is received by the Australian user in the English language as a typical email message. The construction of the message "My favourite sport is suno" can be readily seen in FIGS. 4 and 6. In this example the word "sumo" is highlighted which indicates additional information is available on that word. This information may be descriptive text 148, pictures 150, video 152 or audio 154 which can be accessed from the audio visual panel 146. If a video is available, the video button 152 will be highlighted and can be viewed by clicking on that button. This provides additional material to better explain the contents of the message.

FIG. 8 shows a message screen 160 where messages sent using the screens shown in FIGS. 3 to 6 are received. This screen is for the Japanese user. Again, in order to avoid duplication and repetition of description, integers in FIG. 7 corresponding to integers in FIG. 8 have been given an "A" suffix; for example, REPLY button 144 in FIG. 7 is REPLY button 144A in FIG. 8. In this example the Australian user has sent a message "My favourite sport is footy". As previously discussed the message was constructed by the Australian user in English but is received by the Japanese user in the Japanese language as a typical email message. The construction of the message "My favourite sport is footy" can be readily seen in FIGS. 3 and 5. In this example the word "footy" is highlighted which indicates additional information is available on that word.

The invention allows people living in different countries with different languages and cultures to communicate without the fluency of common languages or ability to use keyboards. The message construction web-based platform enables users to instantly communicate personally relevant messages in a second language and allows the recipients in another country to view the messages with suitable audio visual media, where required, to understand the background. The selection of words from a grid using a pointer device reduces the need for a keyboard. The words and phrases are located on a selectable grid with translation in their native language so the user simply selects words in a guided way to construct messages in a foreign language. The user can follow the instructions on the screen and make prepared sentences, or can combine words or replace certain words with the words or phrases that are suited to the user and construct a message based on foreign language. There can be many words and phrases on the selectable grids from which a user can choose. The pre-prepared sentences or phrases are written in both the native language and the second language and are broken down in words/phrases/sentences.

Users can find sentences that they want to construct and follow the indicated order based on the other language's structure so that the completed sentences would be in the correct order of the other language. The foreign language is indicated together with the original language, therefore, users can view and understand which words stand for which and understand the structural differences and learn the translated word in the process of creating messages. Users construct messages based on their native language so they do not have to be proficient in another language. The user does not have to use a foreign keyboard to convert the native language into the second language.

The recipient of the message will use a mirroring system with reversed language order, and can construct messages in the same way. In this way, both persons can construct messages guided by their native languages and both sides can receive messages in their native languages, allowing them to understand the messages without translation support. The system also allows users to construct words that are not found on the grid, using a particular grid that has letters (alphabets or foreign language equivalent of alphabets) and is possible to combine and create any words they like. Also it is possible for users to directly type in messages without using the grid in their native language or foreign languages from keyboards if they have the confidence to do so. The system also allows users to select completed sentences and phrases to avoid going through the process of constructing sentences by themselves. The system can be used for sending and receiving text messages, or combined with real-time chats or video conferencing functions to facilitate live interactions between users in different countries and/or different languages.

The invention provides a message content that is relevant to the user. This makes it possible to construct messages that are immediately relevant and interesting to the users. Multiple grids are categorized by topics and usage and these are stored on the contents server 26. Grids with contents that are relevant to the logged in user will be selected and displayed, according to the timing of log in and the profile of users. For example, as shown in FIGS. 3, 5 and 7, a 10 year old male user in Melbourne, Australia who likes sport logs-in in September, there will be a grid about footy with words and phrases related to footy e.g. the Grand Final. The grid will contain words, phrases, icons and sentences that are related to footy. He can construct messages about footy in Japanese and send it to his overseas counterpart. On his user interface, there can also be grids related to Melbourne, Victoria, Australia, and other Australian related culture as well as contents that are related to him. The multi language exchange system is a comprehensive loop system that allows users in a particular country with a particular language and culture to create messages that are personally relevant, and also allows users in a different country with a different language and culture to comprehend the message and understand the background in an effective way using audio, video, text background information. The loop system is possible by having a special grid system and having the grid contents linked to the user/location related database 28, and having media files 32-36 linked to the grid contents.

The invention allows users around the world who are not proficient in writing, reading, speaking, and listening to another language to communicate with each other and understand the backgrounds of each other. These proficiency skills are particularly lacking among users of young age in many countries. The system also allows people, especially children, around the world to engage in international exchange in an easy and effective manner, and instantly establish continuous international friendships, with opportunities to learn another language along the way. This makes it particularly useful for existing students of foreign languages to practically use the acquiring language and instantly establish international friendships, which makes the learning meaningful and purposeful for the students giving them additional reason and motivation to continue learning.

The invention facilitates live interaction between users. The invention can be combined with real-time text/voice chats or video conferencing functions which enrich the contents and enhance the effectiveness of communication. The live element of the interaction can be used effectively particularly for children in the Pacific region (but not limited to this region) who are learning second languages because there are minimal time differences between countries in this region and that children can interact with each other and experience international exchange both from school, home, public facilities, and other premises during normal waking hours. Under this environment, the multilanguage communication system itself would also carry a live element as many users are logged on and sending/receiving messages at similar times during the day.

The application of the invention is particularly effective between students in Australia/New Zealand where demand for Asian language/culture learning is high and East Asian countries such as Japan, Korea, Taiwan, China, and Thailand (not limited to these countries) where demand for English learning is high. Australia and New Zealand are the only native English speaking countries that these Asian countries can interact at real-time during their school hours.

Also, the invention can be applied between North America and Latin America, Europe and Asia (European users can interact during school time with Asian counterparts in the evening), and other regions in the world where combinations can be made.

However, without the invention, it is difficult to exchange for the majority of students in these regions through any form of exchanges whether it be real-time chats, video conferencing, voice chats or text messaging, because of the limitations on their language proficiency and on the use of keyboards as well as the vast differences in culture, values, which prevents them to communicate well with each other.

The invention can be used for all age groups and allows cross generation exchange or/and cross cultural exchange.

The invention can be used for dating or match making services between different countries and/or races, and can be used in various forms of exchange.

Although the preferred embodiment is Internet based the invention is to be understood to be not limited to such an environment. The system could be LAN based, IP based, wireless based or use any other suitable communication method. The pointer device is preferably mouse based but could be stylus based or finger based using touch sensitive screens. The operation of the system could also be activated by voice recognition. The screen may be a computer monitor, television, personal digital assistant (PDA), mobile phone, hand held device, laptop computer or any other electronic communication device. The contents server 26 can be substituted by media directly accessible by the user, for example, CD-ROM, hard disk, memory device, etc. An installation program could look for the contents server 26 or any other device or memory location. For use with devices having small screens, for example, mobile phones, the grid elements may be list based elements.

The invention will be understood to embrace many further modifications as will be readily apparent to persons skilled in the art and which will be deemed to reside within the broad scope and ambit of the invention, there having been set forth herein only the broad nature of the invention and a certain specific embodiment by way of example.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form or suggestion that the prior art forms part of the common general knowledge in Australia.

The claims defining the invention are as follows:

1. A multi language exchange system comprising:
   a communication device which displays a screen on which a message in a first language is to be depicted in a second language, said screen displaying a programmable grid or list, wherein each element of the grid or list has at least one sentence, phrase, word, or character of the message displayed in the first language, each grid or list element has an associated indicator indicating to a user the order in which the at least one sentence, phrase, word, or character of the respective grid or list element should be selected relative to the other grid or list elements in order to depict the message in correct grammatical form in said second language; and wherein said communication device depicts on the screen the at least one sentence, phrase, word, or character of the message in the second language and in the order in which the at least one sentence, phrase, word, or character of the message is selected in the first language by the user.

2. The multi language exchange system of claim 1, wherein each grid or list element displays at least one sentence, phrase, word, or character in both the first and second languages.

3. The multi language exchange system of claim 1, wherein said programmable grid or list provides a plurality of sentences, phrases, words, or characters, which are contained in a database, which is sorted under various subjects or interests.

4. The multi language exchange system of claim 3, wherein said database includes user profiles containing personal information on each user and their location.

5. The multi language exchange system of claim 4, wherein said programmable grid or list can display said at least one sentence, phrase, word, or character formed by said grid or list in said first language related to said user profile.

6. The multi language exchange system of claim 3, wherein said database is local to, or remote from, said communication device.

7. The multi language exchange system of claim 1, wherein said communication device communicates via the Internet.

8. The multi language exchange system of claim 1, wherein each grid or list element can be associated with an audio or audio visual file.

9. The multi language exchange system of claim 8, wherein said communication device includes a messaging system to allow said at least one sentence, phrase, word, or character to be forwarded to another user having a similar communication device and said similar communication device can see said at least one sentence, phrase, word, or character together with any associated audio or audio visual files.

10. The multi language exchange system of claim 1, wherein a plurality of said communication devices communicate by at least one of a LAN, IP based system, or wireless based system.

11. The multi language exchange system of claim 1, wherein the user uses a pointer device to select said order.

12. The multi language exchange system of claim 11, wherein said pointer device comprises a mouse, stylus or finger.

13. The multi language exchange system of claim 1, wherein said communication device includes a messaging system to allow said at least one sentence, phrase, word, or character to be forwarded to another user having a similar communication device.

14. The multi language exchange system of claim 1, wherein said communication device is a computer, personal digital assistant (PDA) or mobile phone connected to a communication protocol system.

15. A method of depicting a message in a a first language in a second language comprising:

using a communication device having a screen on which said message in said first language is to be depicted in said second language, said screen displaying a programmable grid or list, wherein each element of the grid or list has at least one sentence, phrase, word, or character of the message displayed in the first language, each grid or list element has an associated indicator indicating to a user the order in which the at least one sentence, phrase, word, or character of the respective grid or list element should be selected relative to the other grid or list elements in order to depict the message in correct grammatical form in said second language; and depicting on the screen the at least one sentence, phrase, word, or character of the message in the second language and in the order in which the at least one sentence, phrase, word, or character of the message is selected in the first language by the user.

16. The method of claim 15, comprising displaying a representation of the at least one sentence, phrase, word, or character in both the first and second languages in each grid or list element of said screen.

17. The method of claim 15, comprising providing a plurality of sentences, phrases, words, or characters which are contained in a database, which is sorted under various subjects or interests to said programmable grid or list of said screen.

18. The method of claim 17, comprising providing said database with user profiles containing personal information on each user and their location.

19. The method of claim 18, comprising displaying said at least one Sentences, phrase, word, or character formed by said grid or list in said first language related to said user profile using said programmable grid or list.

20. The method of claim 17 comprising providing said database to be local to, or remote from, said communication device.

21. The method of claims 15, comprising connecting said communication device via the Internet.

22. The method of claims 15 comprising associating at least one of the grid or list elements with an audio or audio visual file.

23. The method of claim 22 comprising providing a messaging system in said communication device to allow said at least one sentence, phrase, word, or character to be forwarded to another user having a similar communication device and said similar communication device can see said at least one sentence, phrase, word, or character together with any associated audio or audio visual files.

24. The method of claim 15 comprising using a plurality of said communication devices to communicate through said electronic communication system.

25. The method of claim 15 comprising using a messaging system in said communication device to allow said at least one sentence, phrase, word, or character to be forwarded to another user having a similar communication device.

26. The method of claim 15, wherein using said communication device included within a computer, personal digital assistant (PDA) or mobile phone connected to a communication protocol system.

27. The method of claim 15 further comprising receiving inputs from a pointer device used by a user to follow the order to allow said at least one sentence, phrase, word, or character-to be depicted in the correct order, wherein said pointer device is selected from the group consisting of a mouse, stylus, and finger.

* * * * *